United States Patent
Smyth

(10) Patent No.: US 6,598,296 B2
(45) Date of Patent: *Jul. 29, 2003

(54) METHOD OF MANUFACTURING A WHEEL RIM FOR A TWO-PIECE VEHICLE WHEEL ASSEMBLY

(76) Inventor: Larry C. Smyth, 16108 River Point Dr., Charlotte, NC (US) 28278

( * ) Notice: Subject to any disclaimer, the term of this patent is extended or adjusted under 35 U.S.C. 154(b) by 0 days.

This patent is subject to a terminal disclaimer.

(21) Appl. No.: 09/904,033

(22) Filed: Jul. 12, 2001

(65) Prior Publication Data

US 2001/0039732 A1 Nov. 15, 2001

Related U.S. Application Data

(63) Continuation-in-part of application No. 09/476,697, filed on Jan. 3, 2000, now Pat. No. 6,272,748.

(51) Int. Cl.[7] ................................. B23P 17/00
(52) U.S. Cl. .................. 29/894.322; 29/894.35; 29/418; 29/527.6; 72/701; 301/95.101; 301/95.108
(58) Field of Search ............ 29/894.322, 894.32, 29/894.323, 894.35, 894.351, 894.353, 894.354, 418, 527.6; 72/70, 340, 347, 701; 301/95.101, 95.107, 95.108

(56) References Cited

U.S. PATENT DOCUMENTS

| | | | |
|---|---|---|---|
| 2,948,055 A | 9/1960 | Baxter et al. | |
| 3,964,144 A | 6/1976 | Kopp | |
| 4,436,133 A | 3/1984 | Rohr | |
| 4,866,834 A | 9/1989 | Winkler et al. | |
| 5,023,983 A | 6/1991 | Winkler et al. | |
| 5,503,508 A | 4/1996 | Amiguet et al. | |
| 6,272,748 B1 * | 8/2001 | Smyth | 29/894.322 |

FOREIGN PATENT DOCUMENTS

DE  43 39 755  11/1993

* cited by examiner

*Primary Examiner*—P. W. Echols
(74) *Attorney, Agent, or Firm*—Schwartz Law Firm, P.C.

(57) ABSTRACT

A method for manufacturing a wheel rim for a two-piece vehicle wheel assembly. The method includes the step of providing a one-piece alloy wheel form defining an integrally-formed annular rim blank and a rigidifying flange. The rim blank includes first and second edge portions. At least one of the first and second edge portions of the rim blank is shaped. After the shaping step, the one-piece wheel form is cut to separate the shaped wheel rim from the rigidifying flange.

20 Claims, 5 Drawing Sheets

METHOD OF MANUFACTURING A WHEEL RIM FOR A TWO-PIECE VEHICLE WHEEL ASSEMBLY

TECHNICAL FIELD AND BACKGROUND OF INVENTION

This invention relates to a method of manufacturing a wheel rim for a two-piece vehicle wheel assembly. The invention is especially applicable to the automobile parts industry.

One of the largest aftermarket niches in the automobile industry is the manufacture and sale of upgraded alloy wheels. Wheels are a major styling feature which can quickly freshen the appearance of older vehicles, or customize the appearance of new vehicles still at the dealership. Traditionally, aluminum alloy wheels have been cast in one-piece with integrally-formed rim and center sections.

The one-piece wheel was first introduced in the industry as an aftermarket product about 40 years ago. While this wheel was and still is largely successful, problems in manufacturing make it difficult to obtain a high quality casting and finished wheel on a consistent basis. Various manufacturing techniques have been tried in an effort to make a better product, including making the rim section thicker to keep it from leaking, and to increase its overall strength and toughness.

In more recent years, the two-piece alloy wheel has become a viable alternative to one-piece wheels. The two-piece wheel includes an annular wheel rim or "hoop", and a center. The center is cast and machined as before, and then welded to the separately formed rim. The rim is generally formed using a non-heat treatable aluminum alloy sheet which is cut in a strip by shearing to the desired length and width. The strip is passed through a three-roll bender to form a hoop. The butted ends of the hoop are then flattened out and clamped together in a massive electric-resistance upset butt welder. The upset flash at the weld is broached off, and the joint finely sanded to make it non-prominent. The hoop is then flared along each side edge, and is loaded into either a rim rolling or rim spinning line. Rolling basically bends the edge of the rim axially around a mandrel keeping the thickness generally constant. Spinning, on the other hand, pushes the rim axially on the mandrel causing cross-sectional variation. The latter technique reduces the weight and improves the concentricity and strength of the rim. Finally, the wheel assembly is formed by attaching the finished rim to a selected wheel center.

This conventional approach using alloy sheet strips produces quality rims and, as the wheel center is a simple casting which is not required to seal-in air, the two-piece wheel quickly found a market in the industry. Sheet rims are generally made in large quantities for cost effectiveness, and are used with different style wheel centers and with various offsets to allow wide variation in wheel design. Despite this growing market, the one-piece cast wheel community persisted and continued to focus on improving difficult wheel casting methods. There was little incentive at this time to look into casting and machining rims as an alternative to sheet-formed rims in a two-piece wheel assembly. However, because sheet rims are made from sheet, the rims are only 2½ D (dimensional) shapes, i.e., they do not have the 3D shape capability that cast wheels possess in the rim area. Due in part to this limitation, there grew a demand in the industry for cast wheel rims.

Around 1996, the industry experimented with a process for casting and machining wheel rims with a rounded street side flange. The two-piece all-cast wheels made using this process did not sell well, and because they were more expensive to make than either a traditional two-piece or similar looking one-piece wheel, these earlier cast and machined alloy rims were discontinued. They did however suggest an approach for combining the advantages of both one-piece and two-piece wheels.

In the process of developing a cast wheel rim, it was determined that a 100% cast and machined rim was dimensionally truer than conventional sheet rims used in two-piece wheel assemblies, thereby resulting in a smoother vehicle ride. The key was to develop a more cost efficient process for manufacturing the cast wheel rim.

One manufacturer's approach was to cast and heat treat a one-piece wheel form as normal, followed by cutting out the spoked center with a plasma torch, followed by conventional wheel machining. While the casting is designed with a functional "center", its only purpose is to deliver the molten metal to the rim, and not to carry loads. The plasma cutting results in a cast rim shape, i.e., a convoluted hoop, which must then be machined completely to form the rim. Machining typically consists of two operations. In the first operation, the cast front side of the rim is centered and clamped by a dedicated first operation chuck, after which the back side of the rim and wheel is machined to final dimension. In the second operation, the machined inner portion of the wheel rim and center is used to precisely locate and clamp the rim in a separate chuck so that the front side of the wheel can be finish machined to blend perfectly to the first operation machined rim diameters.

Although this process produces high quality rims, it is problematic in several respects. Because the rim casting is essentially a large diameter thin walled hoop, it is very difficult to adjust the machining lathe so as to avoid excessive chatter marks (vibration induced surface irregularities) on the machined surfaces. Other drawbacks to this process include excessive scrap, machining cycles running at twice the rate as those for one-piece wheels, excessive technician set-up time, low cutting insert life, and an extra sanding step required to smooth out the course machining and/or chatter marks in the subsequent rim polishing process. Generally, although various remedies have been explored and minor improvements made, this process is only half as efficient as normal casting and machining for one-piece wheels.

To overcome these and other limitations of the prior art, Applicant determined that a higher quality wheel rim could be produced by leaving the cast center and rim sections of the wheel form in one integrally-formed piece during the entire machining process. The first operation machining of the wheel form and turning was performed in a conventional manner—a well known and essentially trouble free operation. Then, once the first operation machining was complete, a second operation machining was performed on the opposite side of the wheel form, this again being done in a conventional manner. After machining both sides, the center of the wheel form was parted-off using a trepanning tool and then recycled. The key technical point observed was that the center makes the rim rigid and supports it in a rigid condition during the entire machining process. The resulting wheel rim displayed all of the advantages of prior art cast rims in one-piece wheels, and included substantially fewer chatter marks, less machining time, fewer scraps, less technician set-up, and a fine machined surface which requires less polishing.

SUMMARY OF THE INVENTION

Therefore, it is an object of the invention to provide a method of forming a separate wheel rim from a one-piece cast wheel form.

It is another object of the invention to provide a method of forming a cast wheel rim which produces substantially fewer chatter marks and a finer surface after machining.

It is another object of the invention to provide a method of forming a cast wheel rim which reduces vibration of the rim blank during machining.

It is another object of the invention to provide a method of forming a cast wheel rim which requires less machining time.

It is another object of the invention to provide a method of forming a cast wheel rim which results in fewer scraps.

It is another object of the invention to provide a method of forming a cast wheel rim which requires less technician set-up time.

It is another object of the invention to provide a method of forming a cast wheel rim which requires less rim polishing.

It is another object of the invention to provide a method of forming a cast wheel rim wherein the rim has a substantially greater yield strength than conventional aluminum sheet rims.

It is another object of the invention to provide a method of forming a cast wheel rim wherein the rim resists deformation resulting from an impact force.

It is another object of the invention to provide a method of forming a cast wheel rim wherein the rim provides a smooth vehicle ride.

These and other objects of the present invention are achieved in the preferred embodiments disclosed below by providing a method of manufacturing a wheel rim for a two-piece vehicle wheel assembly. The method includes the step of providing a one-piece alloy wheel form defining an integrally-formed annular rim blank and a rigidifying flange. The rim blank includes first and second edge portions. At least one of the first and second edge portions of the rim blank is shaped. After the shaping step, the one-piece wheel form is cut to separate the shaped wheel rim from the rigidifying flange. The term "shaping" is used broadly herein to refer to any surface manipulation of the rim blank including, but not limited to, machining, cutting, grinding, flow forming, and spinning.

According to another preferred embodiment of the invention, wherein the step of cutting the one-piece wheel form includes using a trepanning tool or rotating cutting tool to sever the shaped wheel rim from the rigidifying flange.

According to yet another preferred embodiment of the invention, the method includes the step of clamping the second annular edge portion of the rim blank to secure the rim blank while shaping the first annular edge portion.

According to yet another preferred embodiment of the invention, the method includes the step of clamping the first annular edge portion of the rim blank to secure the rim blank while shaping the second annular edge portion.

According to yet another preferred embodiment of the invention, the method includes the step of centering the wheel form prior to shaping the second annular edge portion.

According to yet another preferred embodiment of the invention, the method includes the step of finishing and polishing the shaped wheel rim after the wheel rim is separated from the wheel form.

According to yet another preferred embodiment of the invention, the method includes the step of turning the wheel form over after shaping the first annular edge portion to expose the second annular edge portion for shaping.

According to yet another preferred embodiment of the invention, the method includes the step of finishing and smoothing the cut made to separate the shaped wheel rim from the supporting center of the wheel form.

According to yet another preferred embodiment of the invention, the method includes the step of recycling the supporting center after separating the shaped wheel rim.

In yet another embodiment, the method of manufacturing a wheel rim for a two-piece vehicle wheel assembly includes the steps of casting or forging a one-piece alloy wheel form defining an integrally-formed annular rim blank and supporting center. The rim blank includes opposing first and second annular edge portions. At least one of the first and second annular edge portions of the rim blank is then machined. After the machining step, the one-piece wheel form is cut to separate the machined wheel rim from the supporting center.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED
EMBODIMENT AND BEST MODE

Figure 1:
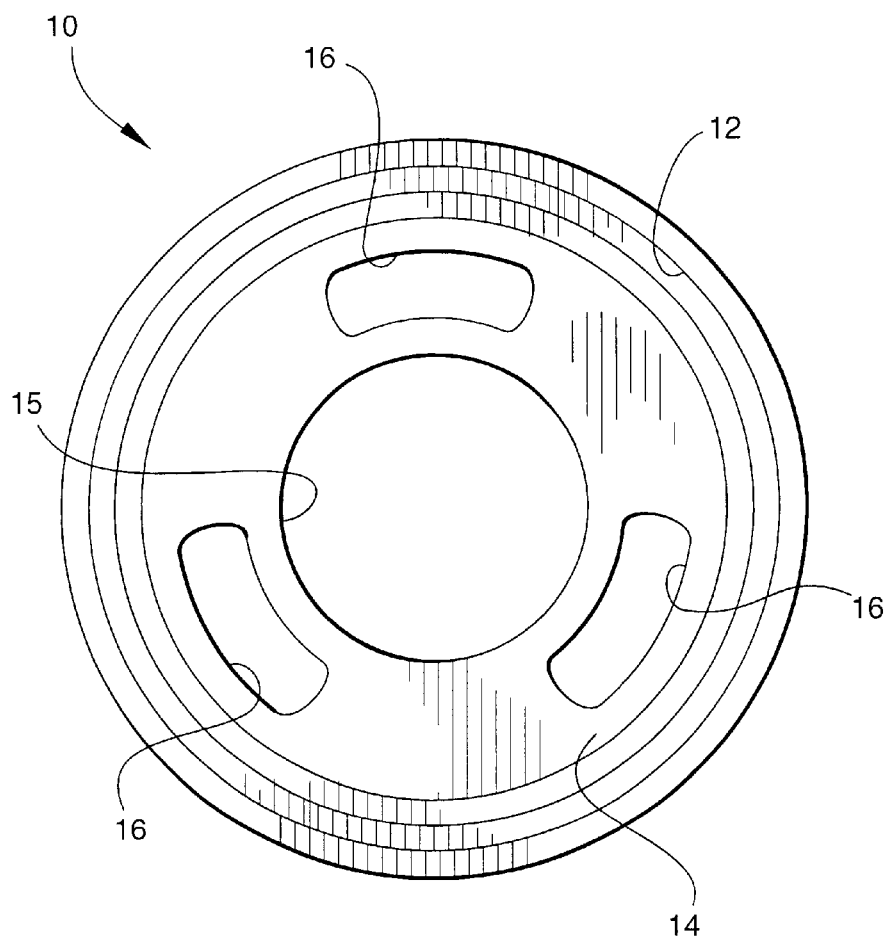
FIG. 1 is a plan view of a vehicle wheel form to be processed according to a method of the present invention.

Referring now specifically to the drawings, a cast alloy wheel form is illustrated in FIG. 1 and shown generally at reference numeral 10. The wheel form 10 is processed according to a method of the present invention to form a 2½ or 3-dimensional, cast alloy wheel rim adapted for use in a two-piece vehicle wheel assembly. The wheel form 10 includes an integrally-formed rim blank 12 and supporting center 14. The center 14 has a pilot bore 15 and several cast windows 16 for receiving wheel alignment and clamping members described below.

Figure 2:
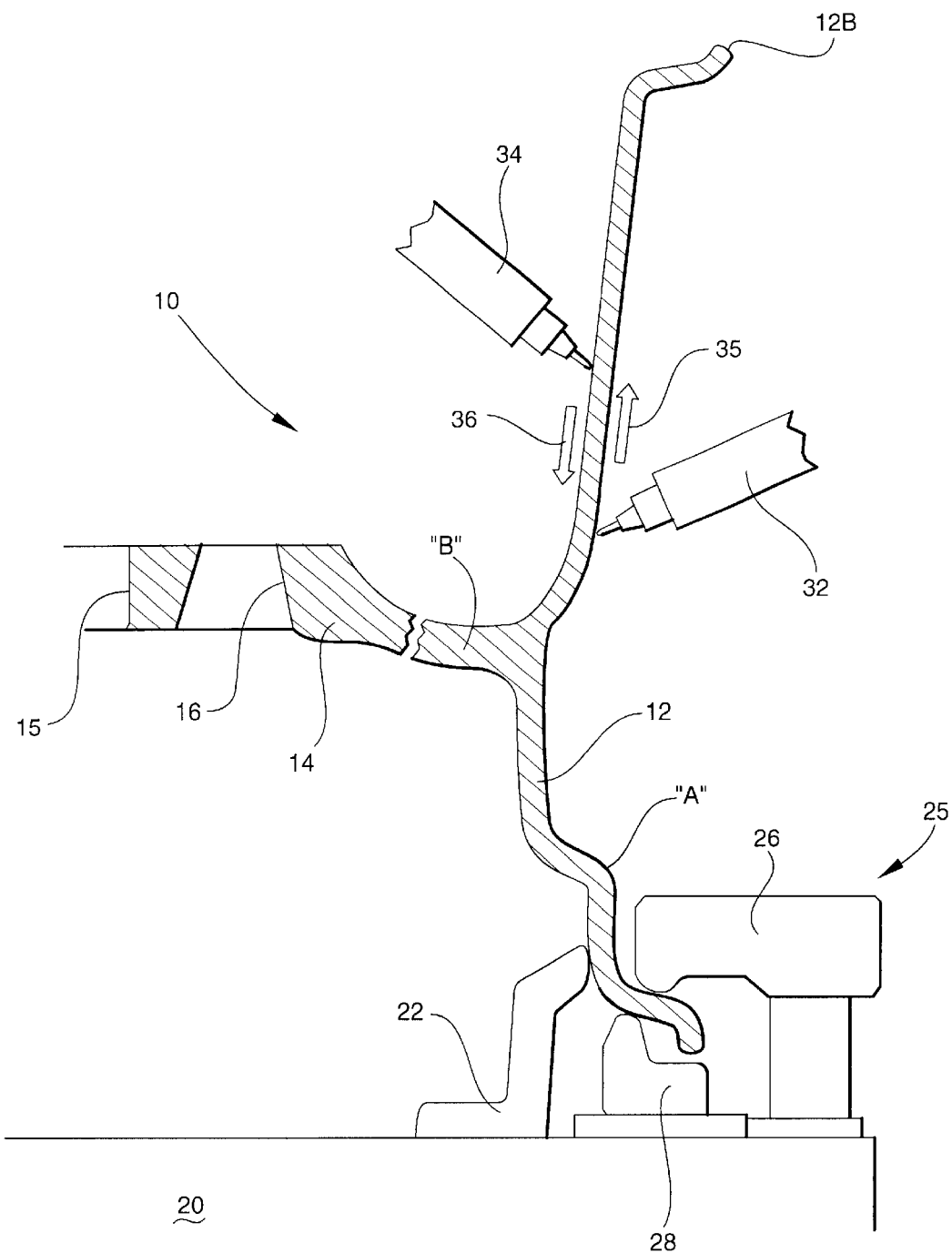
FIG. 2 is fragmentary, cross-sectional view of the wheel form mounted in a wheel chuck and showing cutter tools for machining the inside and outside surfaces of the rim blank.

Referring to FIG. 2, after casting, the alloy wheel form 10 is mounted on a wheel chuck 20 in a vertical lathe. The wheel chuck 20 has a spring-loaded centering device 22 and clamping assembly 25 for engaging and holding an annular edge portion 12A of the rim blank 12. The clamping assembly 25 includes a vertically adjustable flange clamp 26 which bears against an outside surface of the rim edge, and a stationary rest pad 28 which bears against the inside surface of the rim edge. The clamping assembly 25 holds the wheel form 10 in a stable, fixed position during a first operation machining process. Conventional lathe cutting tools 32 and 34 machine the inside and outside surfaces of the cast rim blank 10 beginning from a point located approximately at "A" and traveling, for example, in the direction indicated by arrows 35 and 36 around the opposing annular edge portion 12B of the rim blank 12 to a point located approximately at "B". The lathe cutting tool 34 also machines the pilot bore 15 to facilitate second operation location and center clamping.

Figure 3:
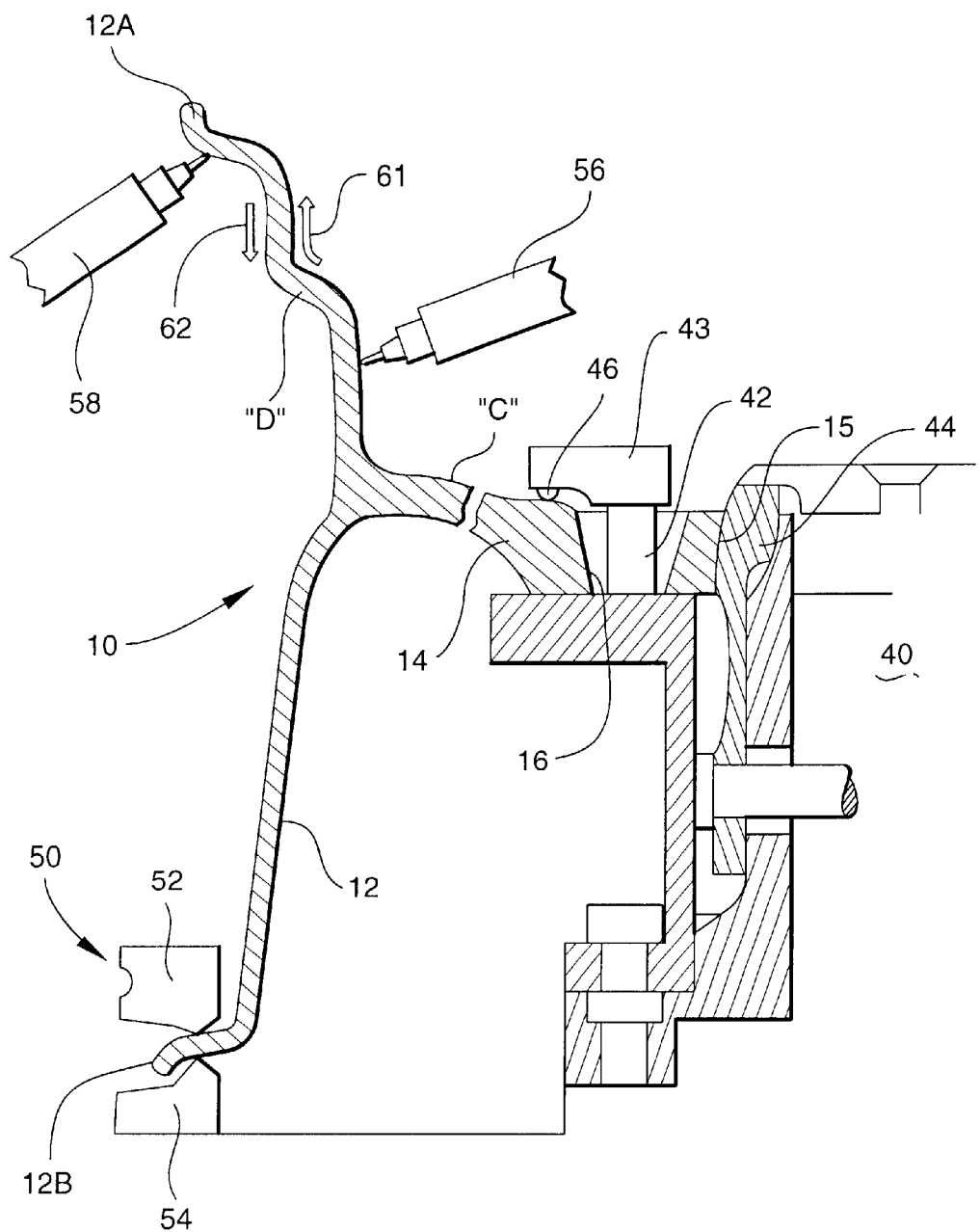
FIG. 3 is fragmentary, cross-sectional view of the wheel form turned over and mounted in a second wheel chuck, and showing cutter tools for machining the remaining surfaces of the rim blank.

After the first operation machining process, the wheel form 10 is turned over and mounted on a collet chuck 40 shown in FIG. 3. This chuck 40 includes three drive dogs 42 (only one shown) each having a retention head 43 (rotated 90 degrees and shown in phantom for clarity) for being received through respective windows 16 of the wheel center 14, and an expanding collet 44 which engages an inside surface of the pilot hole 15 to properly center the wheel form 10 for further processing. The retention head 43 of the drive dog 42 has a spring-loaded detent 46 which engages the wheel center 15. The drive dogs 42 and expanding collet 44 cooperate to hold the wheel form 10 in a stable, fixed position during a second operation machining process. Preferably, a second clamping assembly 50 including a vertically adjustable clamp finger 52 and stationary rest pad 54 is used to hold the rim edge.

Once mounted and secured on the collet chuck 40, conventional lathe cutting tools 56 and 58 machine the inside and outside surfaces of the rim blank 10 beginning from approximately point "C" and traveling, for example, in the direction indicated by arrows 61 and 62 around the edge portion 12A of the rim blank 10 to approximately point "D". The integrally formed wheel center 14 stabilizes the rim blank 12 during the entire machining processes, thereby resulting in reduced vibration and the occurrence of substantially fewer chatter marks.

Figure 4:
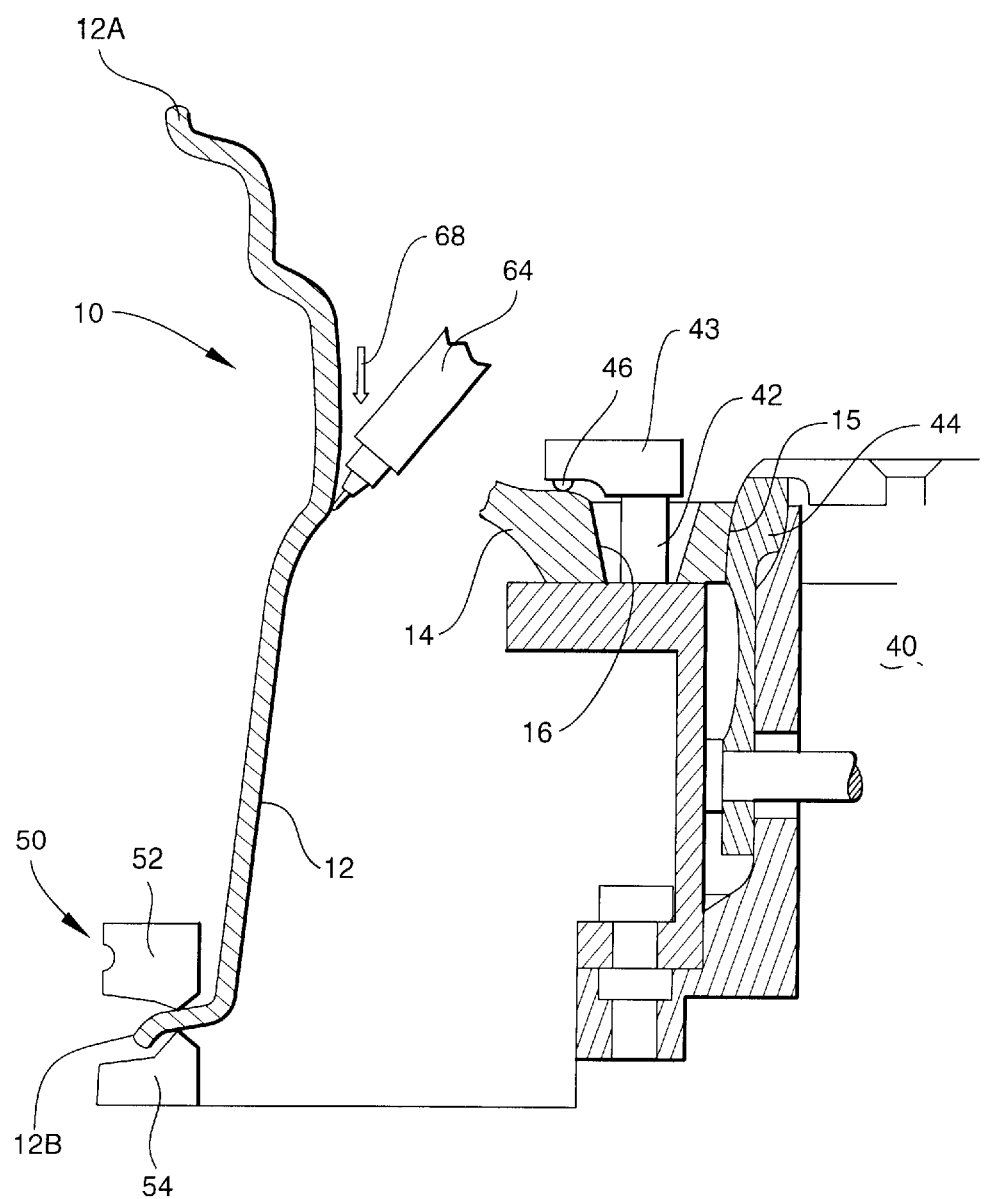
FIG. 4 is fragmentary, cross-sectional view of the wheel form mounted in the second wheel chuck, and showing a cutter tool for separating the machined wheel rim from the supporting center.

As shown in FIG. 4, after the second operation machining and while the wheel form 10 is still secured in the second chuck 40 at both the center 14 and edge of the rim portion 12B, a conventional trepanning tool 64 cuts the wheel form 10 in the direction indicated by arrow 66 at the junction of the rim blank 12 and center 14 to separate the machined wheel rim. The supporting center 14 is scrapped and recycled. A final finishing, smoothing, and polishing process completes the cast wheel rim and readies it for incorporation into a two-piece wheel assembly. The finished wheel rim is attached to the selected wheel center using any suitable means, such as by welding or riveting.

Figure 5:
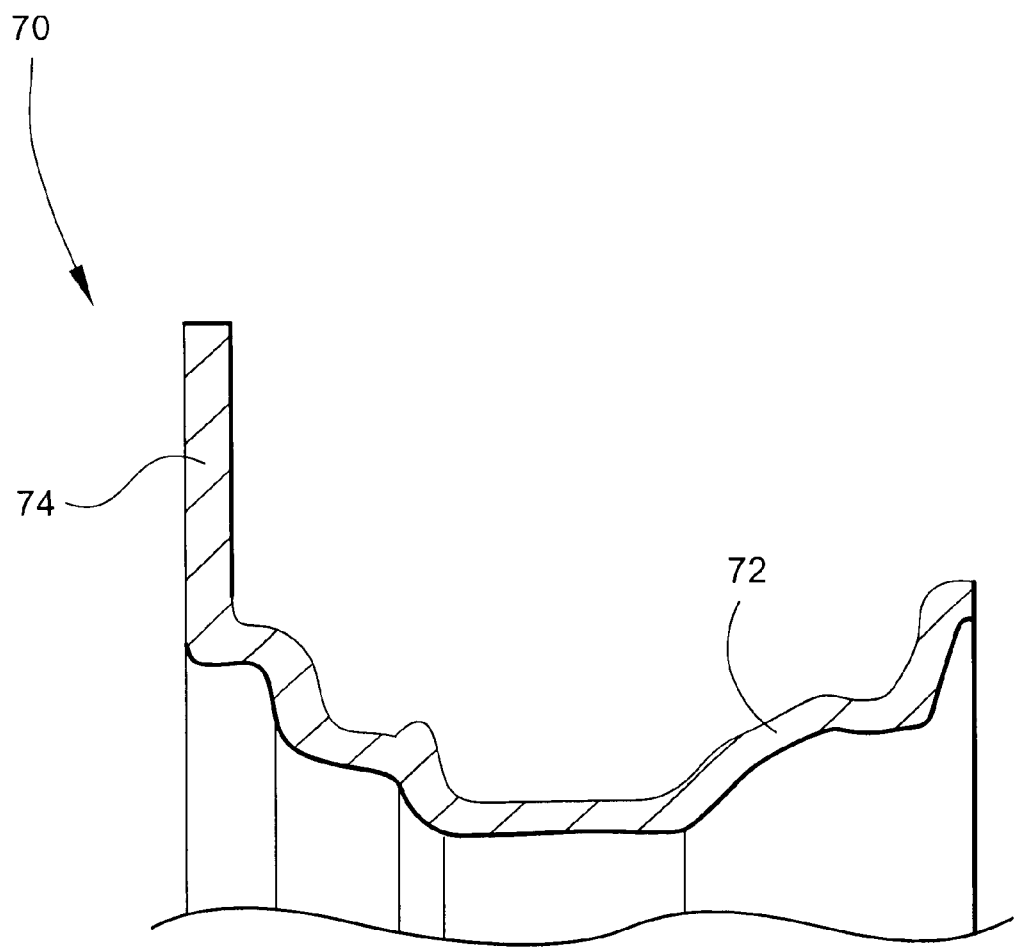
FIG. 5 is a fragmentary, cross-sectional view of a wheel form according to an alternative embodiment of the invention.

A further embodiment of a wheel form 70 suitable for use in practicing the current method is shown in FIG. 5. The wheel form 70 includes a rim blank 72 with an annular rigidifying flange 74 formed around its exterior at one edge of the rim blank 72. The rigidifying flange 74 functions much like the supporting center 14, described above, and is separated from rim blank 72 after machining using a trepanning tool or other suitable device. In a further alternative embodiment, the rigidifying flange may be formed around the exterior of the rim blank at any point from one edge of the rim blank to the other.

The wheel form 10, 70 is preferably cast or forged of a standard aluminum alloy. In addition, a number of conventional wheel chucks may be utilized for securing the wheel form 10 during processing. One such wheel chuck is described in U.S. Pat. No. 5,820,137. The complete disclosure of this patent is incorporated herein by reference.

A method of manufacturing a vehicle wheel rim is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A method of manufacturing a wheel rim for a two-piece vehicle wheel assembly, comprising the steps of:
   (a) providing a one-piece alloy wheel form defining an integrally-formed annular rim blank and a rigidifying flange, the rim blank including first and second edge portions;
   (b) shaping at least one of the first and second edge portions of the rim blank; and
   (c) after the shaping step of (b), cutting the one-piece wheel form to separate the shaped wheel rim from the rigidifying flange.

2. A method according to claim 1, wherein the step of cutting the one-piece wheel form includes using a trepanning tool to sever the shaped wheel rim from the rigidifying flange.

3. A method according to claim 1, and comprising the step of polishing the shaped wheel rim after the wheel rim is separated from the wheel form.

4. A method according to claim 1, and comprising the step of finishing and smoothing the cut made to separate the shaped wheel rim from the rigidifying flange of the wheel form.

5. A method according to claim 1, and comprising the step of recycling the rigidifying flange after separating the shaped wheel rim.

6. A method according to claim 1, and comprising the step of attaching the shaped wheel rim to a separately manufactured wheel center to form a two-piece vehicle wheel assembly.

7. A method of manufacturing a wheel rim for a two-piece vehicle wheel assembly, comprising the steps of:
   (a) casting a one-piece alloy wheel form defining an integrally-formed annular rim blank and a rigidifying flange, the rim blank including first and second annular edge portions;
   (b) machining the first annular edge portion of the rim blank;
   (c) machining the second annular edge portion of the rim blank; and
   (d) after the machining steps of (b) and (c), cutting the one-piece wheel form to separate the machined wheel rim from the rigidifying flange.

8. A method according to claim 7, wherein the step of cutting the one-piece wheel form includes using a trepanning tool to sever the machined wheel rim from the rigidifying flange.

9. A method according to claim 7, and comprising the step of clamping the second annular edge portion of the rim blank to secure the rim blank while machining the first annular edge portion.

10. A method according to claim 7, and comprising the step of clamping the first annular edge portion of the rim blank to secure the rim blank while machining the second annular edge portion.

11. A method according to claim 7, and comprising the step of centering the wheel form prior to machining the second annular edge portion.

12. A method according to claim 7, and comprising the step of polishing the machined wheel rim after the wheel rim is separated from the wheel form.

13. A method according to claim 7, and comprising the step of turning the wheel form over after machining the first annular edge portion to expose the second annular edge portion for machining.

14. A method according to claim 7, and comprising the step of finishing and smoothing the cut made to separate the machined wheel rim from the rigidifying flange of the wheel form.

15. A method according to claim 7, and comprising the step of recycling the rigidifying flange after separating the machined wheel rim.

16. A method according to claim 7, and comprising the step of attaching the machined wheel rim to a separately manufactured wheel center to form a two-piece vehicle wheel assembly.

17. A method of manufacturing a wheel rim for a two-piece vehicle wheel assembly, comprising the steps of:
   (a) providing a one-piece alloy wheel form defining an integrally-formed annular rim blank and supporting center, the rim blank including first and second annular edge portions;
   (b) shaping at least one of the first and second edge portions of the rim blank; and
   (c) after the shaping step of (b), cutting the one-piece wheel form to separate the shaped wheel rim from the supporting center.

18. A method of manufacturing a wheel rim for a two-piece vehicle wheel assembly, comprising the steps of:
   (a) providing an alloy wheel form comprising an annular rim blank and supporting center, the rim blank including first and second edge portions;
   (b) shaping at least one of the first and second edge portions of the rim blank; and
   (c) after the shaping step of (b), cutting the one-piece wheel form to separate the shaped wheel rim from the supporting center.

19. A method of manufacturing a wheel rim for a two-piece vehicle wheel assembly, comprising the steps of:
   (a) providing a one-piece alloy wheel form defining an integrally-formed annular rim blank and supporting center, the rim blank including first and second annular edge portions;
   (b) clamping the second annular edge portion of the rim blank to secure the rim blank in position while exposing the first annular edge portion;
   (c) machining the first annular edge portion of the rim blank;
   (d) turning the wheel form over after machining the first annular edge portion of the rim blank to expose the second annular edge portion for machining;
   (e) clamping the first annular edge portion of the rim blank to secure the rim blank in position;
   (f) machining the second annular edge portion of the rim blank; and
   (g) after the machining step of (f), cutting the one-piece wheel form to separate the machined wheel rim from the supporting center.

20. A method according to claim 19, and comprising the step of attaching the machined wheel rim to a separately manufactured wheel center to form a two-piece vehicle wheel assembly.

* * * * *